(12) United States Patent
Costea et al.

(10) Patent No.: US 7,414,525 B2
(45) Date of Patent: Aug. 19, 2008

(54) REMOTE MONITORING OF REMEDIATION SYSTEMS

(75) Inventors: Emil Costea, Minneapolis, MN (US); Richard Simons, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 96 days.

(21) Appl. No.: 11/306,791

(22) Filed: Jan. 11, 2006

(65) Prior Publication Data

US 2007/0162245 A1 Jul. 12, 2007

(51) Int. Cl.
*G08B 29/00* (2006.01)
(52) U.S. Cl. .................. 340/514; 340/504; 340/531; 702/100; 422/37
(58) Field of Classification Search ............... 340/514, 340/531; 700/282, 301; 702/100, 50; 429/53; 422/37
See application file for complete search history.

(56) References Cited

U.S. PATENT DOCUMENTS

| | | | |
|---|---|---|---|
| 4,016,360 A | | 4/1977 | Cane |
| 4,920,263 A | | 4/1990 | Fimian et al. |
| 5,191,874 A | | 3/1993 | McWilliams |
| 5,197,862 A | | 3/1993 | Kladder |
| 5,388,444 A | | 2/1995 | Gerard |
| 5,425,923 A | * | 6/1995 | Swisher et al. ............ 422/188 |
| 5,495,722 A | | 3/1996 | Manson et al. |
| 5,551,797 A | | 9/1996 | Sanford |
| 5,729,474 A | | 3/1998 | Hildebrand et al. |
| 5,761,649 A | | 6/1998 | Hill |
| 5,836,815 A | | 11/1998 | Jennemann |
| 5,903,626 A | | 5/1999 | Igelhart et al. |
| 5,997,476 A | | 12/1999 | Brown |
| 6,088,688 A | | 7/2000 | Crooks et al. |
| 6,167,766 B1 | | 1/2001 | Dunn et al. |
| 6,175,934 B1 | | 1/2001 | Hershey et al. |
| 6,282,454 B1 | | 8/2001 | Papdopoulos et al. |
| 6,356,205 B1 | * | 3/2002 | Salvo et al. ............ 340/853.3 |

(Continued)

FOREIGN PATENT DOCUMENTS

EP 1196002 10/2002

(Continued)

OTHER PUBLICATIONS

"RTCA's E-Smart Radon Monitoring Service," Radon Testing Corporation of America, 3 pages, prior to Jan. 11, 2006.

(Continued)

*Primary Examiner*—George A Bugg
*Assistant Examiner*—Hoi C Lau (57) ABSTRACT

Systems and methods for remotely testing the operational status of a remediation system installed within a building or structure are disclosed. An illustrative remote monitoring system can include a sensor adapted to sense at least one characteristic of the remediation system, an interface in communication with the sensor, a gateway in communication with the interface, and a remote computer located away from the building or structure. The interface can be configured to convert sensor signals received from the sensor into an output signal having a format or platform supported by the gateway. The remote computer can include an interface that can be used by a servicing agent to transmit and receive signals to and from the gateway for monitoring and testing the operation of the remediation system.

14 Claims, 8 Drawing Sheets

U.S. PATENT DOCUMENTS

| | | | |
|---|---|---|---|
| 6,385,510 B1 | 5/2002 | Hoog et al. | |
| 6,467,054 B1 | 10/2002 | Lenny | |
| 6,493,425 B1 | 12/2002 | Abe | |
| 6,496,858 B1 | 12/2002 | Frailong et al. | |
| 6,535,838 B2 | 3/2003 | Abraham et al. | |
| 6,539,499 B1 | 3/2003 | Stedman et al. | |
| 6,557,054 B2 | 4/2003 | Reisman | |
| 6,574,672 B1 | 6/2003 | Mitchell et al. | |
| 6,584,113 B1 | 6/2003 | Manduley et al. | |
| 6,584,430 B1 | 6/2003 | Rosenbaum et al. | |
| 6,601,086 B1 | 7/2003 | Howard et al. | |
| 6,643,611 B1 | 11/2003 | Ito et al. | |
| 6,658,372 B2 | 12/2003 | Abraham et al. | |
| 6,658,586 B1 | 12/2003 | Levi | |
| 6,697,894 B1 | 2/2004 | Mitchell et al. | |
| 6,711,470 B1 | 3/2004 | Hartenstein et al. | |
| 6,754,707 B2 | 6/2004 | Richards et al. | |
| 6,782,345 B1 | 8/2004 | Siegel et al. | |
| 6,792,321 B2 | 9/2004 | Sepe, Jr. | |
| 6,826,512 B1 | 11/2004 | Dara-Abrams et al. | |
| 6,836,737 B2 | 12/2004 | Petite et al. | |
| 6,847,916 B1 | 1/2005 | Ying | |
| 6,853,958 B1 | 2/2005 | Turin et al. | |
| 6,854,010 B1 | 2/2005 | Christian et al. | |
| 6,857,013 B2 | 2/2005 | Ramberg et al. | |
| 6,891,838 B1 | 5/2005 | Petite et al. | |
| 6,892,225 B1 | 5/2005 | Tu et al. | |
| 7,003,405 B1 * | 2/2006 | Ho | 702/32 |
| 7,144,551 B2 * | 12/2006 | Helton et al. | 422/37 |
| 2002/0018697 A1 * | 2/2002 | Vinegar et al. | 405/128.55 |
| 2002/0095269 A1 | 7/2002 | Natallni et al. | |
| 2002/0095323 A1 | 7/2002 | Combs et al. | |
| 2002/0113877 A1 | 8/2002 | Welch | |
| 2002/0125998 A1 * | 9/2002 | Petite et al. | 340/286.01 |
| 2002/0147804 A1 | 10/2002 | Cosmao et al. | |
| 2002/0147806 A1 | 10/2002 | Hasegawa | |
| 2002/0183880 A1 | 12/2002 | Arima et al. | |
| 2002/0183978 A1 | 12/2002 | Koyama et al. | |
| 2002/0198990 A1 | 12/2002 | Bradfield et al. | |
| 2003/0034898 A1 | 2/2003 | Shamoon et al. | |
| 2003/0101262 A1 | 5/2003 | Godwin | |
| 2003/0110001 A1 | 6/2003 | Chassin et al. | |
| 2003/0140090 A1 | 7/2003 | Rezvani et al. | |
| 2003/0148171 A1 * | 8/2003 | Mitlitsky et al. | 429/53 |
| 2003/0176989 A1 | 9/2003 | Matsuda | |
| 2003/0195640 A1 | 10/2003 | Krocker et al. | |
| 2004/0133314 A1 | 7/2004 | Ehlers et al. | |
| 2004/0232345 A1 | 11/2004 | Jagam et al. | |
| 2005/0033707 A1 | 2/2005 | Ehlers et al. | |
| 2005/0077249 A1 * | 4/2005 | Kerfoot | 210/747 |
| 2005/0103874 A1 * | 5/2005 | Erdman, Jr. | 236/51 |
| 2005/0130652 A1 | 6/2005 | OToole et al. | |
| 2005/0131652 A1 | 6/2005 | Corwin et al. | |
| 2005/0154494 A1 * | 7/2005 | Ahmed | 700/275 |
| 2005/0164678 A1 | 7/2005 | Rezvani et al. | |
| 2005/0225441 A1 * | 10/2005 | Kernan | 340/506 |
| 2006/0234621 A1 * | 10/2006 | Desrochers et al. | 454/239 |

FOREIGN PATENT DOCUMENTS

| | | |
|---|---|---|
| EP | 1196003 | 10/2002 |
| EP | 0848215 | 12/2004 |
| JP | 2002044750 | 2/2002 |
| WO | 9965192 | 12/1999 |
| WO | 0001169 | 1/2000 |

OTHER PUBLICATIONS

Clapman et al., "An SNMP-Based Approach for Home Bus Network Management," Proceedings of the International Conference on Consumer Electronics, 4 pages, Jun. 8-10, 1992.

* cited by examiner

REMOTE MONITORING OF REMEDIATION SYSTEMS

FIELD

The present invention relates generally to the field of remote monitoring for remediation systems. More specifically, the present invention pertains to monitoring systems and methods for remotely testing the operating status of a remediation system installed within a building or structure.

BACKGROUND

Vapor intrusion remediation systems are sometimes used in buildings or structures for removing volatile chemicals from subsurface soil or groundwater contamination. In certain radon-mitigation applications, for example, such remediation systems can be used to reduce or eliminate the presence of radon gasses within the interior of a home or office building. Typically, the remediation system will include a ventilation fan and a number of exhaust pipes for providing direct ventilation to the basement or ground floor of the building, or alternatively, for channeling the contaminated volatiles from under the foundation of the building directly to the ambient air.

The type of remediation system employed will typically vary depending on the type of building or structure that is to be ventilated. A subslab depressurization technique, for example, is often employed in radon reduction applications where a basement or slab-on-grade foundation is present. A submembrane suction technique, in turn, is often used in those radon reduction applications where a crawlspace is present. Other reduction techniques such as sealing, house/room depressurization, and heat recovery ventilation (HRV) may also be utilized to reduce the presence of volatile gasses in some cases. Other factors such as the types and levels of the volatile components present, the type of building construction, the cost of installation and operation, etc. will also have an impact on the particular type of remediation system employed.

Maintenance of the various components of the remediation system such as the ventilation fan and exhaust pipes must be periodically performed to ensure proper operation. Typically, such maintenance is performed by an in-person visit by a servicing agent contracted with the homeowner or building manager to service the remediation system. Such process is both costly and inefficient, often requiring the homeowner or building manager to be present during the servicing visit. Since a failure of the remediation system may occur without the knowledge of the building's occupants, there also may be periods of down-time in which remediation system is not fully operational, increasing the likelihood of vapor intrusion during the period of time between inspections.

SUMMARY

The present invention relates to monitoring systems and methods for remotely testing the operational status of a remediation system installed within a building or structure. An illustrative remote monitoring system for remotely testing a remediation system can include a sensor adapted to sense at least one characteristic of the remediation system, a gateway/interface in communication with the remediation, and a remote user such as a computer located away from the building or structure and in communication with the gateway/interface. In some embodiments, the gateway can include a self-test mode that can be configured to automatically shut down a ventilation fan or pump, allowing a pressure or flow sensor to sense whether a change in flow has occurred indicating that the ventilation fan or pump is operating properly. The interface can be configured to convert the signals received from the sensor into an output signal having a format or platform that is supported by the gateway. In one illustrative embodiment, for example, the interface can be configured to convert 24 VAC signals received from the sensor into a format that can be recognized on an ENVIRACOM platform used by the gateway to support one or more other interconnected devices.

Various signals can be sent and received remotely via an interface such as a graphical user interface, allowing a servicing agent or contractor to receive test reports at a remote location away from the site of the remediation system. The remote user can further send signals and/or programming information to the gateway/interface allowing the gateway to be programmed by an administrator from a remote location, or, in some embodiments, to manually test the operating status of the remediation system from a remote location via a remote computer. The remote user can connect to the gateway/interface via a remote communications infrastructure, which may include a wired or wireless connection. In some embodiments, connection to the gateway/interface can be accomplished over the Internet via a web portal or other suitable connection means. A graphical user interface can be provided to permit a servicing agent, manufacturer, or other desired user to view information about the remediation system, including its current operating status. Other client information such as account records, addresses, telephone numbers, etc. can also be displayed along with the operating status of the remediation system, if desired.

An illustrative method of remotely testing a remediation system installed within a building or structure may include the steps of initializing a self-test mode within the gateway and transmitting a test signal to a ventilation fan or pump installed within a building or structure, the test signal configured to shut-down the ventilation fan for a period of time; sensing the presence of flow through an exhaust conduit in communication with the ventilation fan or pump once the fan has been shut-down; and transmitting a test report to a servicing agent. If no ventilation or flow exists, the gateway can be configured to turn on the ventilation fan or pump in order to re-establish normal operation and transmit a test report to the servicing agent at the next scheduled time period. If ventilation or flow does exist within the conduit indicating a problem with the remediation system, the gateway can be configured to transmit the test report immediately to the servicing agent, prompting the agent to take immediate action to remedy the problem. Testing of the remediation system can occur automatically via an algorithm or routine programmed within the gateway/interface adapted to test the remediation system at certain time intervals. In some embodiments, testing of the remediation system can occur manually via a signal sent to the gateway via a servicing agent or administrator tasked to monitor the remediation system from a remote location.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although several examples are provided for the various elements, those skilled in the art will recognize that many of the examples provided have suitable alternatives that may be utilized. For example, while the illustrative steps and methods are described with respect to vapor intrusion remediation systems, it should be understood that other remediation systems can be monitored using the monitoring systems and methods discussed herein.

Figure 1:
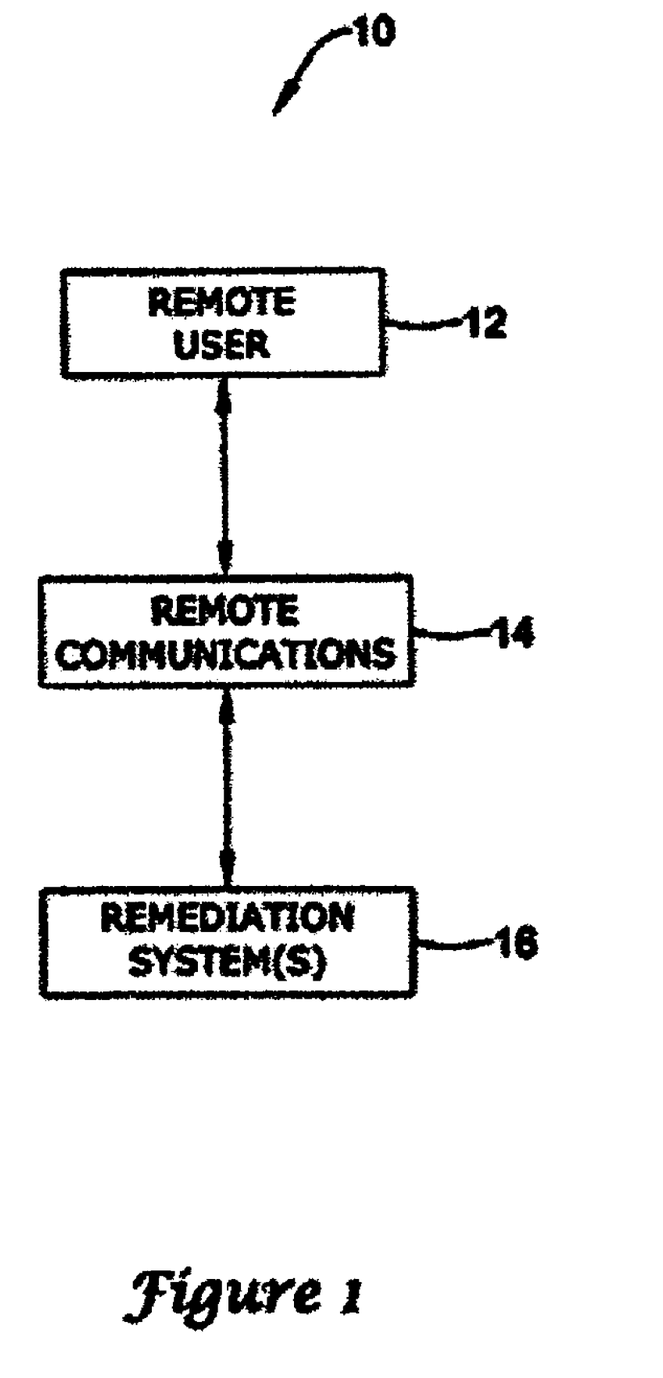
FIG. 1 is a schematic block diagram of an illustrative system for remotely monitoring one or more remediation systems.

Referring now to FIG. 1, a schematic block diagram of an illustrative system 10 for remotely monitoring one or more remediation systems will now be described. As shown in FIG. 1, the monitoring system 10 can include a remote user 12 configured to communicate via a remote communications block 14 with one or more remediation systems 16 installed within a home, office complex, or other such building or structure. A remediation system 16 that can be controlled by the monitoring system 10 may include, for example, a vapor intrusion remediation system for reducing radon, carbon monoxide, carbon dioxide, volatile organic compounds (VOC's) or other such volatile gasses. Alternatively, or in addition, the remediation system 16 may include a water remediation system for reducing lead, VOC's, or other volatile chemicals within the building or structure's water supply. Other systems such as an HVAC system may be further controlled by the monitoring system 10, if desired.

The remote user 12 can include a computer having various hardware and/or software for performing one or more of the various steps described herein. In some embodiments, for example, the remote user 12 can include a personal computer or web server, a display monitor, and various communications and connectivity means such as a modem or Internet connection. The remote user 12 can also include a number of additional components such as data storage and/or data routing that can be utilized for data logging. In some embodiments, and as further described below, the remote user 12 can further include a graphical user interface (GUI) that can be accessed by a servicing agent, manufacturer, or other such user for remotely controlling various aspects of the remediation system, including testing, maintenance and operation.

The remote user 12 can be configured to both transmit and receive various signals to and from each remediation system 16 via the remote communications block 14. The remote user 12 can be further configured to manipulate the data received from one or more of the remediation systems 16 and generate a report and/or output a response based on the received data. In some embodiments, for example, the remote user 12 can be configured to receive various testing data from one or more of the remediation systems 16 and generate a report informing a servicing agent of the current operational status of each system 16.

The remote communications block 14 can be configured to provide a communications link between the remote user 12 and each remediation system 16. The remote communications block 14 may represent, for example, a wired communications link such as fiber optic, cable, twisted pairs or the like, or a wireless communications link such as radio, cellular, satellite, infrared or the like. In some embodiments, the remote communications block 14 may include Internet connectivity that permits the remote user 12 to obtain various status and operational information about each remediation system 16 via a web-page portal. The remote communications block 14 can be capable of bi-directional communications between the remote user 12 and each remediation system 16.

Figure 2:
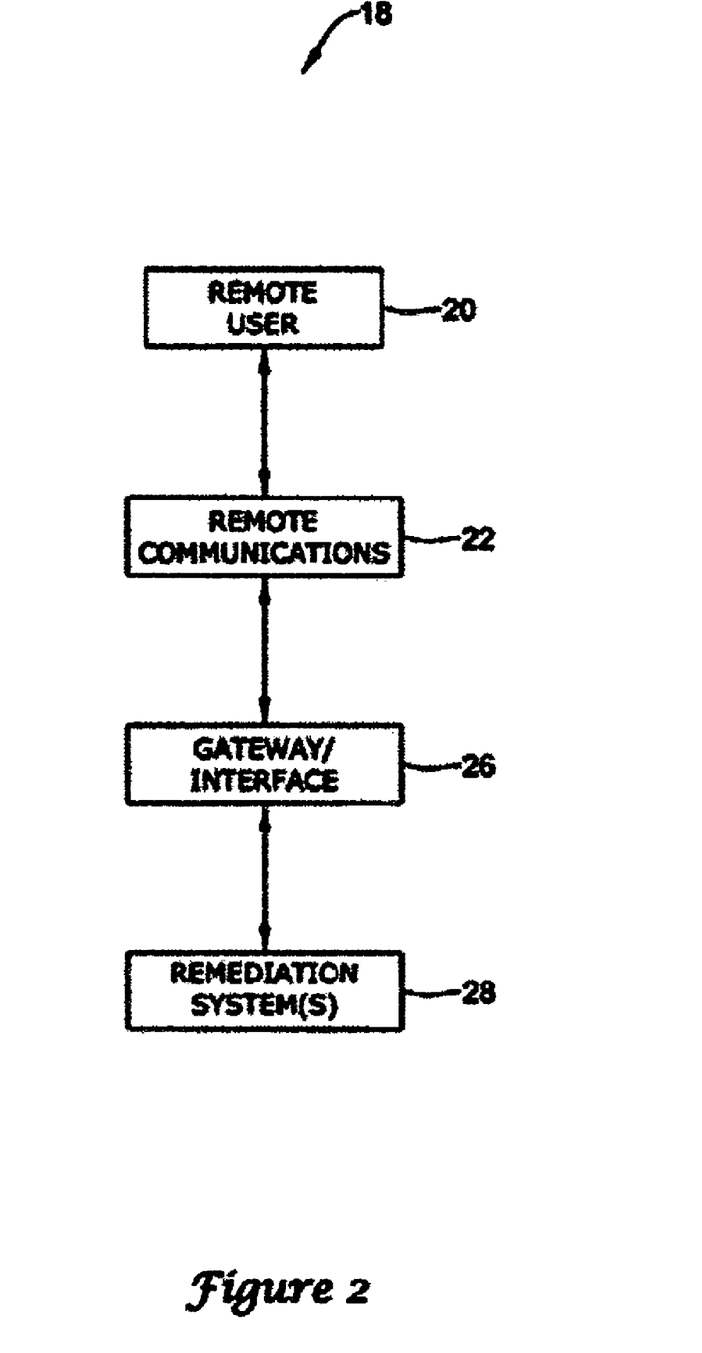
FIG. 2 is a schematic block diagram of another illustrative system for remotely monitoring one or more remediation systems using a gateway/interface unit.

FIG. 2 is a schematic block diagram showing another illustrative system 18 for remotely monitoring one or more remediation systems using a gateway/interface unit. As can be seen in FIG. 2, the monitoring system 18 can include a remote user 20 adapted to communicate via a remote communications block 22 with a gateway/interface unit 26 containing various software and/or hardware enabling communication over the Internet or an Intranet connection. The gateway/interface unit 26 may include a microprocessor and memory useful for storing and transmitting test and/or maintenance routines or algorithms that can be initiated automatically at certain time periods (e.g. once a day, twice a day, etc.), or manually by a test request received from the remote user 20 or from some other client. The gateway/interface unit 26 can be a commercially available component such as, for example, an ENVIRACOM component available from Honeywell International Inc. of Morristown, N.J.

The gateway/interface unit 26 can be configured to convert various signals received from one or more of the remediation systems 28, and provide an output signal having a format or platform that can be understood by the remote computer 20. In some embodiments, for example, the gateway/interface unit 26 can be configured to convert signals received from one or more of the remediation systems 28 into a format that can be understood by the remote user 20 and/or one or more other interconnected systems such as another remediation system 28 or an HVAC system. In some applications, for example, the gateway/interface unit 26 can be configured to convert one or more sensor or switching signals received from one of the remediation systems 28 into a format that can be used by a connected HVAC controller tasked to regulate the amount of ventilation occurring within the building or structure. While depicted as a combined gateway/interface unit 26 in FIG. 2, the unit 26 can comprise separate gateway and interface components, with the interface component adapted to operate using many of the same protocols as used by the gateway component.

Figure 3:
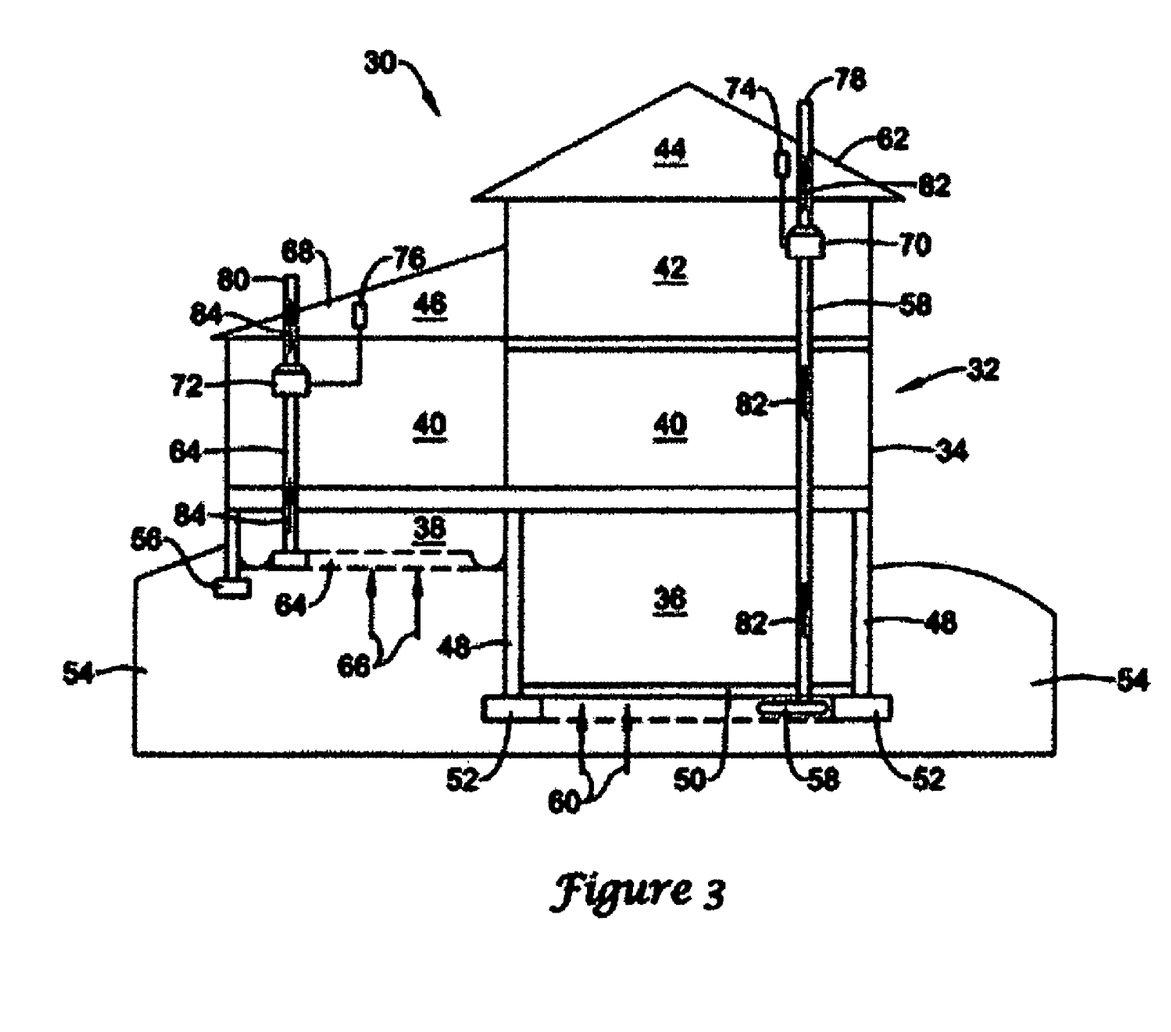
FIG. 3 is a diagrammatic view of an illustrative vapor intrusion remediation system for use in the removal of radon gasses within a building or structure.

FIG. 3 is a diagrammatic view of an illustrative vapor intrusion remediation system 30 for use in the removal of radon gasses within a building or structure 32. As shown in FIG. 3, the building or structure 32 may include a multi-story home 34 having a basement section 36, a crawl space section 38, a main floor 40, an upper floor 42, and a number of attic sections 44,46. The basement section 36 of the home 34 can include a number of concrete or block walls 48 and a concrete slab flooring 50, which together can be attached to a number of footings 52 supporting the foundation of the home 34 to the adjacent ground 54. The crawl space section 38 of the home 34, in turn, can be connected to the adjacent ground 54 via footing 56, and is shown having an open floor with no concrete slab. It should be understood that while the home 34 depicted in FIG. 3 represents a particular building or structure 32, other configurations are also possible.

The remediation system 30 can include a number of ventilation fans and exhaust conduits for channeling volatile gasses away from the interior of the home 34 and into the ambient air. In the illustrative application depicted in FIG. 3, for example, the remediation system 30 includes a first vent pipe 58 that can be used to vent radon, carbon monoxide, or other volatile gasses 60 located underneath the concrete slab flooring 50 of the basement section 36 into the ambient atmosphere located above roof 62. A second vent pipe 64 of the remediation system 30, in turn, can be used to vent volatile gasses 66 located within the crawl space section 38 into the ambient atmosphere located above roof 68. As indicated generally by dashed lines, the portions of the vent pipes 58,64 located adjacent to the ground 54 can be perforated to permit the suction of gasses 60,66 into the interior of the pipes 58,64.

A number of ventilation fans 70,72 can be provided to permit the active remediation of gasses 60,66 within each ventilation pipe 58,64. The ventilation fans 70,72 can be installed in-line with each respective ventilation pipe 58,64, and can be connected to a corresponding electrical controller 74,76 that can be used to actuate the ventilation fans 70,72 between an on-off position, a number of discrete positions, or a number of variable positions. When activated, the ventilation fans 70,72 act to draw the volatile gasses 60,66 upwardly through the ventilation pipes 58,64 and out an exhaust opening 78,80 on the roof 62,68, as indicated generally by arrows 82,84. The ventilation pipes 58,64 are typically placed in hidden locations within the interior of the home 34 such as in closets or between walls, and are typically separate from the normal ventilation, heating and cooling functions performed by the HVAC system.

Figure 4:
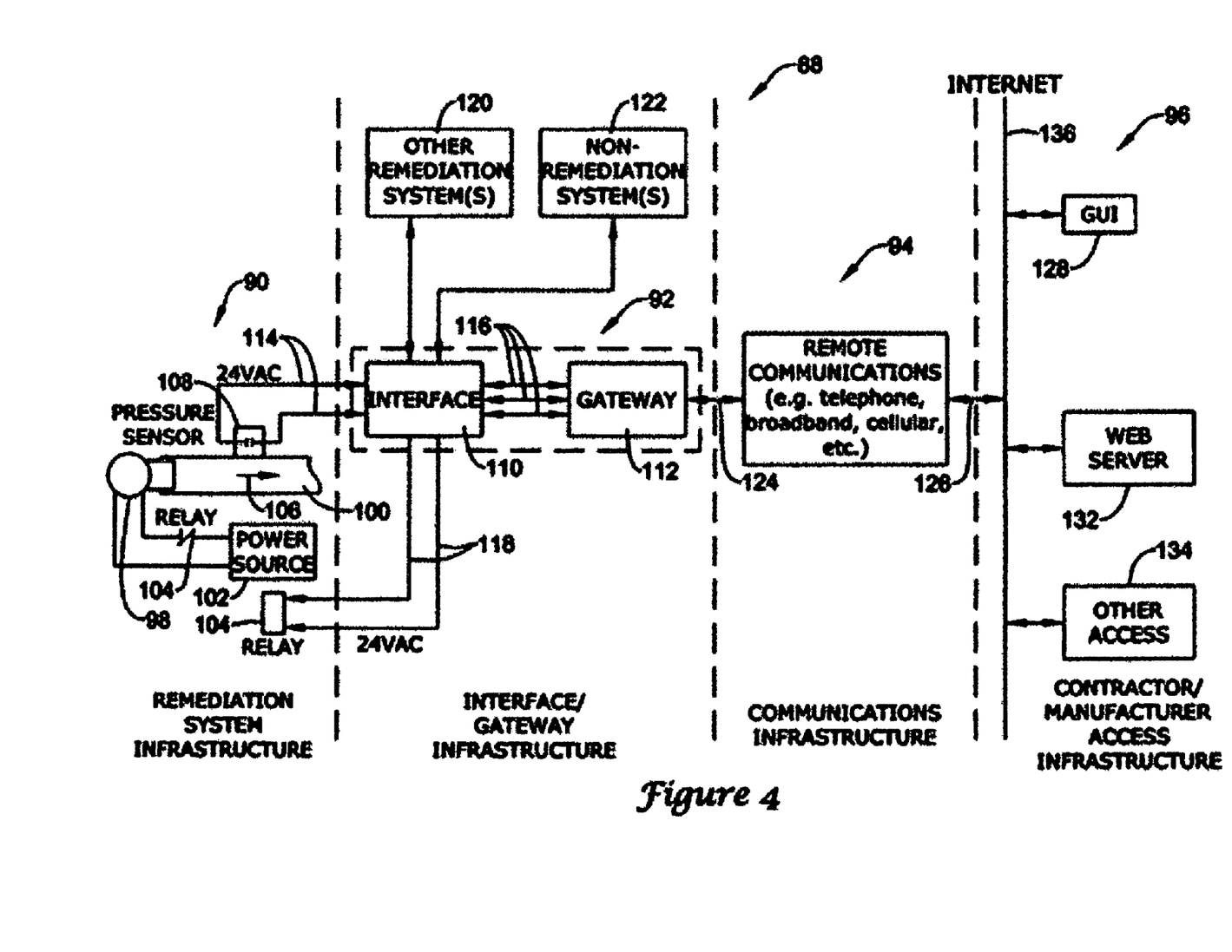
FIG. 4 is a schematic diagram of an illustrative monitoring system for remotely monitoring a remediation system.

FIG. 4 is a schematic diagram of an illustrative monitoring system 88 for remotely monitoring a remediation system such as that described above with respect to FIG. 3. As shown in FIG. 4, the monitoring system 88 can include various components, including a remediation system infrastructure 90, an interface/gateway infrastructure 92, a communications infrastructure 94, and a contractor/manufacturer access infrastructure 96. The remediation system infrastructure 90 can include various components for mitigating volatile gasses within a building or structure. In some embodiments, for example, the remediation system infrastructure 90 can include a ventilation fan 98 and an exhaust conduit 100, which together can be used to provide positive ventilation of a home, office complex, or other such building or structure. The ventilation fan 98 can be powered with a power supply 102, and can be actuated between an on and off position via a relay switch 104 or other suitable switching device. During operation, the ventilation fan 98 can be actuated between a number of discrete or variable speed positions depending on the amount of airflow 106 required to remove the volatile gasses within the building or structure.

The airflow 106 outputted by the ventilation fan 98 can be sensed with a sensor or switch 108, which as is discussed in greater detail below, can be used to test the operational status of the ventilation fan 98, either automatically or manually via a gateway and/or remote computer. In some embodiments, the sensor 108 can include a differential pressure sensor having at least two pressure ports capable of sensing pressure gradients within the exhaust conduit 100. Alternatively, and in other embodiments, the sensor 108 can comprise a number of individual pressure sensors (e.g. gage sensors, vacuum pressure sensors, absolute pressure sensors, etc.) that can be used to sense pressure at multiple locations along the length of the exhaust conduit 100. In yet other embodiments, the sensor 108 can include a flow sensor capable of measuring flow through the exhaust conduit 100. Typically, the sensor 108 will be placed at a location close to the output of the ventilation fan 98, allowing subtle changes in pressure or flow to be sensed.

The interface/gateway infrastructure 92 for the monitoring system 88 can include an interface unit 110 and a gateway unit 112, which can be configured to provide an interface between the remediation system infrastructure 90 and the communications infrastructure 94. The gateway unit 112 can include various algorithms or routines that can be automatically run at certain schedule time periods for testing the operating status of the remediation system infrastructure 90. In some embodiments, for example, the gateway unit 112 can include a self-test mode configured to automatically test the remediation system infrastructure 90 once a day, twice a day, once a week or at some other desired interval. The gateway unit 112 can be configured to automatically test the remediation system infrastructure 90 irrespective of whether a communications link has been made to a remote user via the communications infrastructure 94, allowing the gateway unit 112 to test the remediation system without interruption in the event a communications problem has occurred with the communications infrastructure 94.

The interface unit 110 can be configured to receive the sensor signals 114 from the sensor 108, and then convert these signals 114 into signals 116 that can be recognized by the gateway unit 112 and any device connected to the gateway unit 112. In some embodiments, for example, the interface unit 110 can be configured to convert the 24VAC signals commonly outputted by many pressure or flow sensors into another format that can be used by other components of the monitoring system 88. In one such embodiment, the interface unit 110 can be used to convert the signals 114 received from the sensor 108 into a format that can be understood by one or more other devices operating on an ENVIRACOM platform. It should be understood, however, that the interface unit 110 can be configured to provide connectivity to a wide range of other platforms and/or standards, as desired.

The interface unit 110 can be configured to transmit various signals to one or more of the components of the remediation system infrastructure 90. As shown in FIG. 4, for example, the interface unit 110 can be configured to transmit a 24VAC signal 118 to the relay switch 104 that can be used to turn the ventilation fan 98 on or off. The interface unit 110 can also provide a number of other signals for selectively controlling other remediation system components such as the power supply 102 and/or sensor 108. As indicated generally by the dashed box in FIG. 4, the interface unit 110 can be formed as an integral component along with the gateway unit 112. Alternatively, and in other embodiments, the interface unit 110 can comprise a separate component from the gateway unit 112.

The interface unit 110 can be further connected to a number of other remediation and non-remediation systems 120,122 to facilitate integrated control over these systems, if desired. Examples of other remediation systems 120 that can be connected to the interface unit 110 may include a water remediation system for removing volatile compounds (e.g. VOC's) in the building or structure's water supply, or another vapor remediation system for the removal of volatile gasses at a different location within the building or structure or within another building or structure. An example of a non-remediation system 122 that can be connected to the interface unit 110 can include an HVAC system, which can be configured to vary the amount of ventilation within the building or structure based at least in part on the presence of any volatile gasses therein.

The remote communications infrastructure 94 can be used to transmit various signals 124 back and forth between the gateway unit 112 and the contractor/manufacturer access infrastructure 96. The remote communications infrastructure 94 can provide a wired and/or wireless communications link 126 including, but not limited to, cellular, satellite, radio, telephone, cable, DSL, modem, fax, Internet, and/or Intranet. The communications infrastructure 94 can be capable of bidirectional communications between the gateway unit 112 and one or more components of the contractor/manufacturer access infrastructure 96.

The contractor/manufacturer access infrastructure 96 may provide information to a servicing agent, manufacturer or other such user regarding the operational status of the ventilation fan 98, sensor 108, as well as other components of the remediation system infrastructure 90. The infrastructure 96 can further provide information about the one or more other remediation or non-remediation systems 120,122, if desired. The infrastructure 96 can include a personal computer equipped with a graphical user interface (GUI) 128, a web server/database 132 adapted to store test reports and other status information sent from the gateway unit 112 as well as various account information for each client, and/or one or more other access ports 134 for providing information to a user. One or more of the infrastructure components 128,132, 134 can be connected to the gateway unit 112 via an Internet connection 136, allowing the user to access information about the remediation system via a web-page portal. In some embodiments, for example, a remote computer can be connected to the gateway unit 112 via an Internet connection 136, allowing a servicing agent to monitor the status of the remediation system infrastructure 90 from a remote location via the GUI 128.

Figure 5:
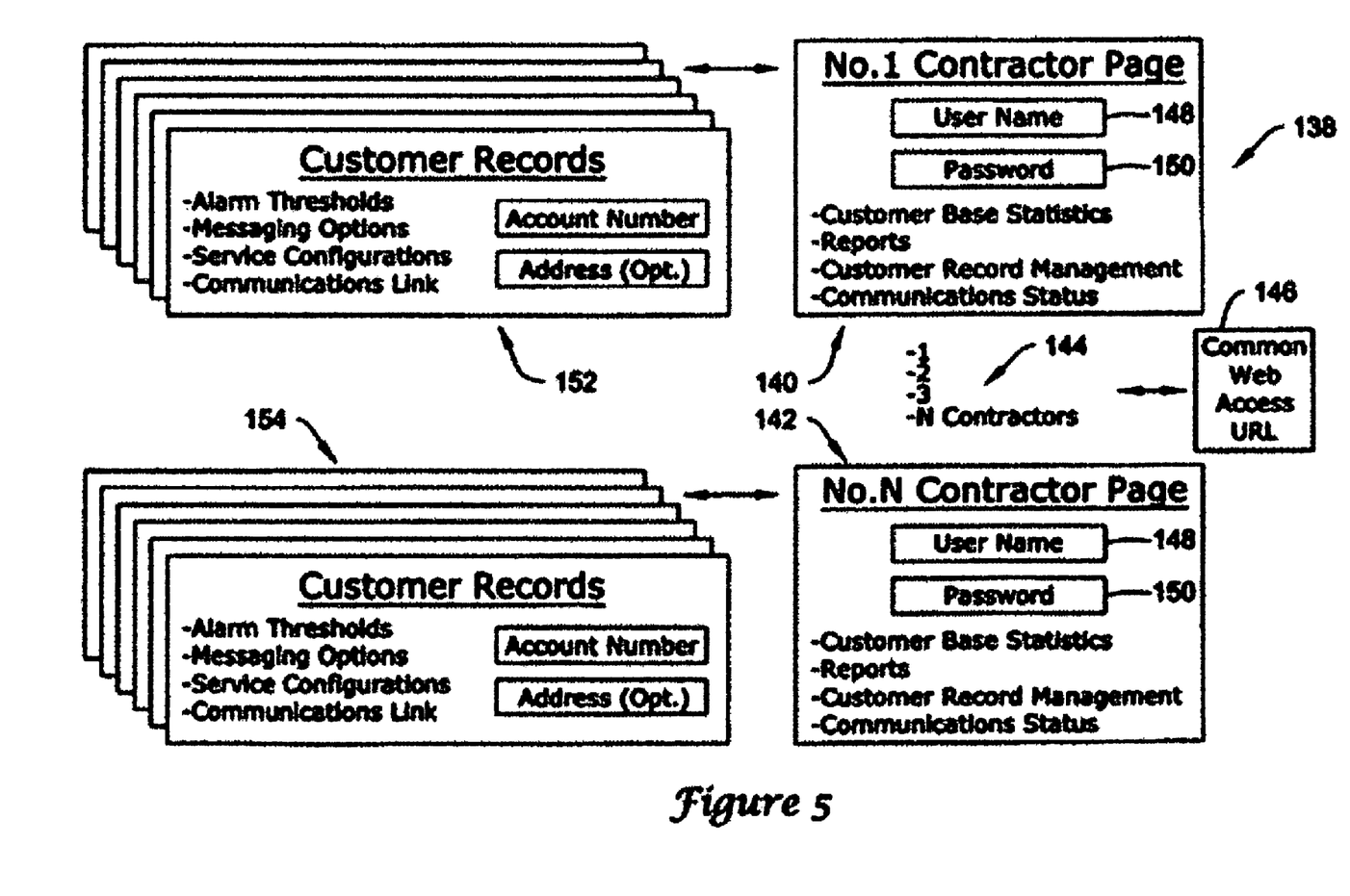
FIG. 5 is a schematic diagram of an illustrative contractor graphical web access page.

FIG. 5 is a schematic diagram of an illustrative embodiment of a contractor web access page 138 displayable on the GUI 128 of FIG. 4. As shown in FIG. 5, the web access page 138 can include a number of separate contractor pages 140, 142 for access by one or more contractors 144 via a common web access URL 146. Each separate contractor page 140,142 may prompt the user to enter a user name 148 and password 150 in order to gain access to the customer's records. Upon access, the contractor web access page 138 can be configured to display information about a particular customer such as various usage and operational statistics, reports, customer record management, communications status, etc.

Each of the contractor pages 140,142 can be linked to a corresponding customer database 152,154. Each customer database 152,154 can include information for each customer such as account number, address, alarm thresholds, messaging options, services configurations, communications links, etc. A memory or data storage unit can be provided to store such information on the web server 132, a personal computer, or other such device.

Figure 6:
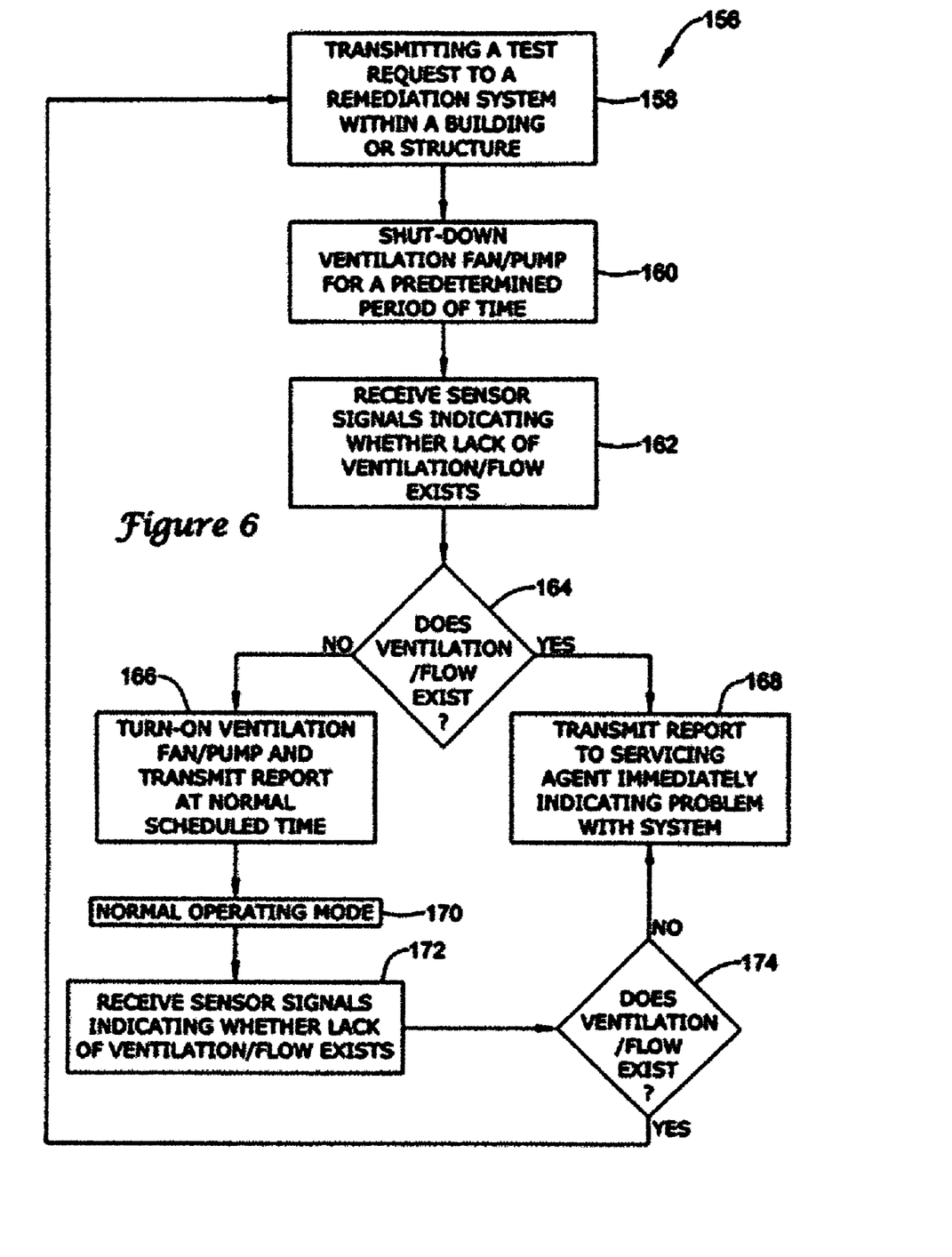
FIG. 6 is a schematic block diagram of an illustrative method for remotely monitoring the operational status of a remediation system using the illustrative monitoring system of FIG. 4.

Referring now to FIG. 6, an illustrative method 156 for remotely monitoring the operational status of a remediation system using the illustrative monitoring system 88 of FIG. 4 will now be described. Method 156 may begin at block 158, wherein a self-test mode is initiated within the gateway unit 112 resulting in a testing request being sent to the remediation system infrastructure 90 to test the operational status of the ventilation fan 98. Initiation of the testing request may occur, for example, automatically at a preset time scheduled within the gateway unit 112, when a fault is detected by a sensor in communication with the ventilation fan and exhaust conduit, or manually by a remote servicing agent contracted with the client to service the remediation system. In the latter case, for example, a signal received from a remote user can be configured to manually override the normal testing schedule programmed within the gateway unit 112, causing the gateway unit 112 to immediately begin testing the remediation system. In some embodiments, initiation of the testing request may occur automatically by the gateway unit 112 when the sensor 108 fails to detect a sufficient amount of airflow 106 through the exhaust conduit 100, indicating a possible problem with the ventilation fan 98.

Once a testing request has been initiated, a signal can be sent via the interface unit 110 to the relay switch 108, causing the ventilation fan 98 to turn on the ventilation fan (if necessary) and then temporarily shut-down the fan 98 for a predetermined period of time, as indicated generally by block 160. In some embodiments, for example, a signal can be sent causing the ventilation fan 98 to shut down for a period of several minutes (e.g. 1-3 minutes) sufficient for self-testing of the remediation system to occur. During this period of time, the interface unit 110 can be configured to receive sensor signals 114 from the sensor 108 that can be utilized to determine whether a lack of ventilation/flow exists despite the activation of the ventilation fan 98, as indicated generally by block 162. A change in pressure or flow sensed by the sensor 108 immediately after shut-down may indicate, for example, a change in state within the exhaust conduit 100, indicating that the ventilation fan 98 is working properly. Conversely, no associated change in pressure or flow sensed by the sensor 108 may indicate that no airflow was present in the exhaust conduit 100 prior to shut-down, indicating that the ventilation fan 98 may not be operating properly.

At decision block 164, the gateway unit 112 can then determine whether ventilation/flow exists using the sensor signals received at block 162. If the gateway unit 112 determines that no ventilation/flow exists thus indicating proper system operation, the gateway unit 112 can be configured to turn on the ventilation fan and then transmit a report (e.g. via the communications infrastructure 94) to the servicing agent at the next scheduled time period indicating that the remediation system is operating properly, as indicated generally at block 166. Conversely, if during the self-test mode ventilation/flow does exist indicating a fault, the gateway unit 112 can be configured to immediately transmit a report to the servicing agent indicating that a problem has occurred with the remediation system requiring further testing and/or maintenance, as indicated generally by block 168. In some embodiments, the test report sent to the servicing agent may indicate that the system is operating within acceptable limits, requires maintenance, or that some further follow-up action is needed. In other embodiments, additional information such as the value of the pressure or flow within the exhaust conduit 100 may be further provided to the servicing agent or manufacturer for further analysis, if desired.

As further indicated at block 170, once the ventilation fan or pump has been turned on upon determining that ventilation or flow does exist (block 164), the gateway unit 112 can then exit the self-test mode and reestablish the normal operating mode for a period of time. In those embodiments where the self-test mode is scheduled to run for approximately 3 minutes, for example, the normal operating mode may operate for the remainder of the 24 hour period (i.e. 23 hours and 57 minutes) after testing has occurred, allowing the testing cycle to occur once per day. Unlike the self-test mode, the normal operating mode receives sensor signals to ensure that there is ventilation/flow at all times while the fan or pump is running, as indicated generally at block 172. If at decision block 174, the sensor signals indicate that ventilation/flow does exist, the gateway unit 112 can continue in the normal operation mode until the next scheduled testing period. Conversely, if at decision block 174 the sensor signals indicate that there is no ventilation or flow, the gateway unit 112 can be configured to immediately transmit a report indicating that a problem has occurred with the remediation system.

Because monitoring of the remediation system can be accomplished automatically from a remote location away from the building or structure, monitoring of the remediation system is more efficient than in-person visits to the remediation site. Moreover, since such off-site testing can be performed quickly and automatically, monitoring can occur on a more regular basis and at less cost than scheduling in-person visits. Monitoring of the remediation system can occur, for example, automatically once a day, once a week, once a month, or at some other desired time interval.

Figure 7:
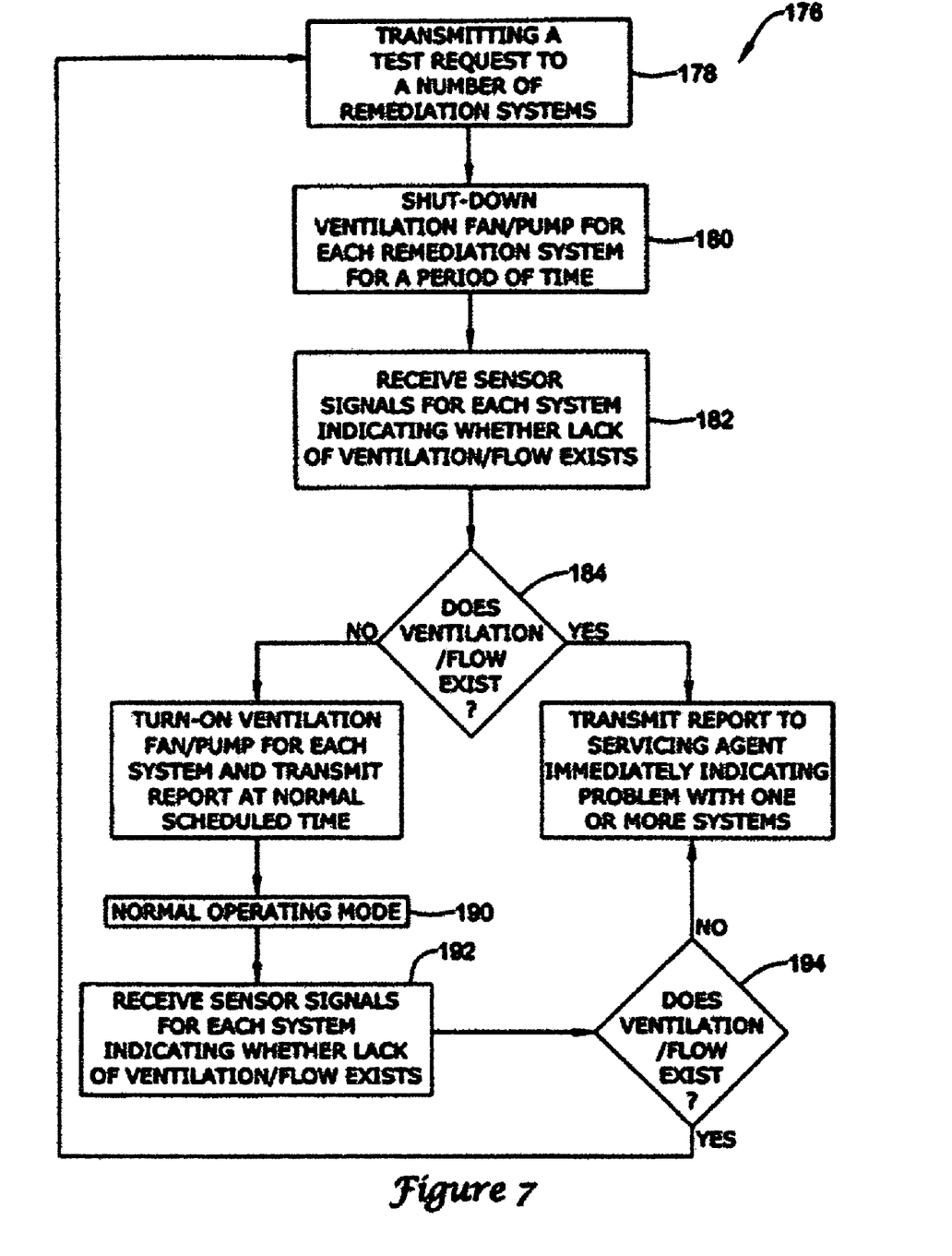
FIG. 7 is a schematic block diagram of another illustrative method for remotely monitoring the operational status of a number of different remediation systems.

FIG. 7 depicts another illustrative method 176 for remotely monitoring the operational status of a number of different remediation systems. As shown in FIG. 7, method 176 may begin at block 178, wherein a self-test mode is initiated within the gateway unit 112 resulting in a test request being sent to one or more remediation systems installed within a building or structure, or within a number of different buildings or structures. Initiation of the test request may occur, for example, automatically at a preset time scheduled within the gateway unit 112, when a fault is detected by a sensor in communication with the ventilation fan and exhaust conduit, or manually by a remote servicing agent contracted with each client to service the remediation systems.

Once a testing request has been initiated, signals can be sent via an interface unit to each remediation system, causing the ventilation fan for each system to turn on (if necessary) and then temporarily shut down for a predetermined period of time, as indicated generally by block 180. During this period of time, the status of each ventilation fan can be checked by receiving sensor signals indicating whether the ventilation fan for each remediation system is operating properly, as indicated generally by block 182. The status of each ventilation fan may be checked, for example, by temporarily shutting down each ventilation fan for a predetermined period of time, and then sensing whether a pressure drop or change in flow occurs at the output of the ventilation fan, indicating whether the fan is operating properly. The testing of each ventilation fan in this manner can occur at the same time, sequentially one ventilation fan at a time, or randomly. As indicated generally at decision block 184, the gateway unit 112 can then determine whether ventilation/flow exists for each system using the sensor signals received at block 182. If the gateway unit 112 determines that no ventilation/flow exists thus indicating proper system operation, the gateway unit 112 can be configured to turn on the ventilation fan for each system and then transmit a report to the servicing agent at the next scheduled time period indicating that the remediation system is operating properly, as indicated generally by block 186. Conversely, if during the self-test mode ventilation ventilation/flow does exist, the gateway unit 112 can be configured to immediately transmit a report to a servicing agent indicating that a problem with one or more system has occurred requiring further testing and/or maintenance, as indicated generally by block 188.

As further indicated at block 190, once the ventilation fan or pump has been turned on upon determining that ventilation or flow does exist (block 184), the gateway unit 112 can then exit the self-test mode and reestablish the normal operating mode for a period of time. During the normal operating mode, sensor signals can be received to ensure that there is ventilation/flow at all times while the fan or pump is running, as indicated generally at block 192. If at decision block 194, the sensor signals indicate that ventilation/flow does exist, the gateway unit 112 can continue in the normal operating mode until the next scheduled testing period. Conversely, if at decision block 194 the sensor signals indicate that there is no ventilation or flow, the gateway unit 112 can be configured to immediately transmit a report indicating that a problem has occurred with the remediation system.

Figure 8:
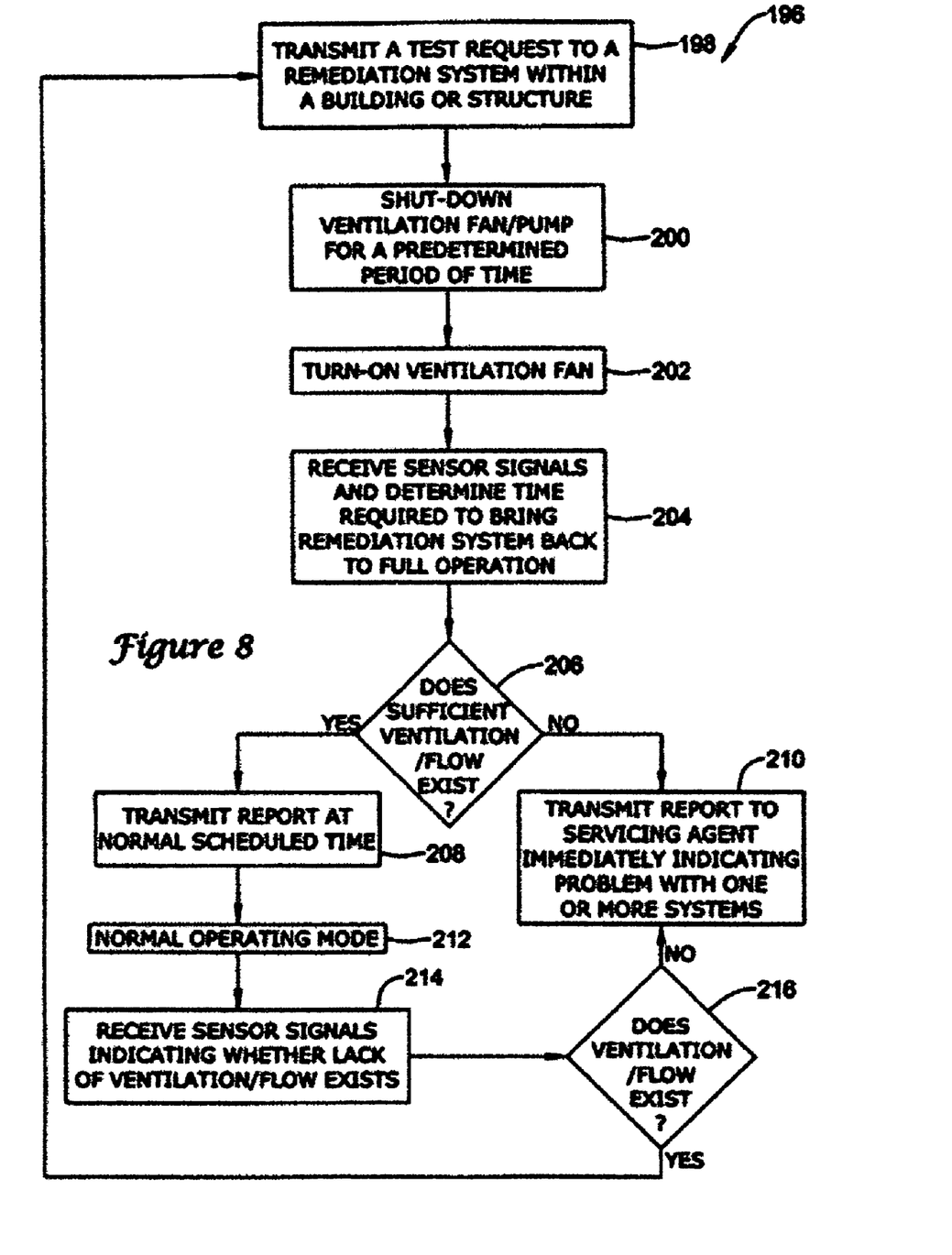
FIG. 8 is a schematic block diagram of another illustrative method for remotely monitoring the operational status of a remediation system.

FIG. 8 depicts another illustrative method 196 for remotely monitoring the operational status of a remediation system. As shown in FIG. 8, method 196 may begin at block 198, wherein a self-test mode is initiated within the gateway unit 112 resulting in a test request being sent to the remediation system infrastructure 90 to test the operational status of the ventilation fan 98. As with other embodiments herein, initiation of the testing request may occur automatically at a preset time scheduled within the gateway unit 112, when a fault is detected, or manually by a remote servicing agent contracted with the client to service the remediation system.

Once a testing request has been initiated, a signal can be sent via an interface unit to the remediation system, causing the ventilation fan 98 to temporarily shut down for a predetermined period of time, as indicated generally by block 200. Once the airflow within the exhaust conduit has stabilized to a low-flow equilibrium state, a signal can then be sent causing the ventilation fan to turn on, as indicated generally by block 202, thus reestablishing flow within the exhaust conduit. During this startup period, a pressure or flow sensor in communication with the ventilation fan and exhaust conduit can be used to measure the response time required to bring the remediation system back to a fully operational or equilibrium state, as indicated generally by block 204. A relatively short period of time required to bring the remediation system back to operation may indicate, for example, that the ventilation fan is operating properly and that the exhaust conduit is unobstructed. Conversely, a relatively long period of time required to bring the remediation system back to operation may indicate that the ventilation fan is not operating properly or that the exhaust conduit is obstructed and may require cleaning. During this startup period, other characteristics such as the peak airflow or peak pressure can be further sensed to test the condition of the remediation system, if desired.

At decision block 206, the gateway unit 112 can then determine whether sufficient ventilation/flow exists using the sensor signals received at block 204. If sufficient ventilation or flow exists, the gateway unit can be configured to transmit a report to the servicing agent at the next scheduled time period indicating that the remediation system is operating properly, as indicated generally at block 208. Conversely, if ventilation is not sufficient, the gateway unit 112 can be configured to immediately transmit a report the servicing agent indicating that a problem has occurred with the remediation system requiring further testing and/or maintenance, as indicated generally at block 210. The steps of reestablishing normal operation and checking for ventilation or flow can then be performed at blocks 212, 214 and 216 in a manner similar to that described above.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A remote monitoring system for remotely testing at least one remediation system installed within a building or structure, each remediation system including a ventilation fan and an exhaust conduit, the remote monitoring system comprising:
   a sensor adapted to sense the presence of airflow within the exhaust conduit;
   an interface in communication with the sensor and a switch for switching the ventilation fan between an on and off position, the interface adapted to convert sensor signals received from the sensor into an output signal; and
   a gateway in communication with the interface, the gateway adapted to transmit said output signal to a remote computer located away from the building or structure;
   wherein the remote computer is configured to send one or more test signals to actuate the ventilation fan between said on and off positions and is further configured to analyze the output signals received from the sensor during each of the on and off positions.

2. A method of remotely testing at least one remediation system installed within a building or structure, each remediation system including a ventilation fan or pump, an exhaust conduit in communication with the ventilation fan or pump, and at least one sensor adapted to sense the presence of fluid flow within the exhaust conduit, the method comprising the steps of:
   shutting down the ventilation fan or pump for a period of time;
   sensing the presence of fluid flow through the exhaust conduit during the period of time that the ventilation fan or pump has been shut-down; and
   transmitting a first test report back to a remote computer located away from the building or structure.

3. The method of claim 2, further comprising the step of providing a gateway and an interface in communication with the ventilation fan or pump and the at least one sensor, the interface adapted to convert sensor signals received from the sensor into output signals having a format or platform supported by the gateway.

4. The method of claim 3, wherein said step of shutting down the ventilation fan or pump is accomplished automatically via a self-test mode of the gateway unit.

5. The method of claim 2, wherein said step of sensing the presence of fluid flow through the exhaust conduit is accomplished using a pressure or flow sensor.

6. The method of claim 2, wherein said step of causing the ventilation fan or pump to shut-down is accomplished via a relay switch connected to the ventilation fan or pump.

7. The method of claim 2, further comprising the steps of:
   transmitting a test signal to the ventilation fan or pump causing the fan or pump to turn-on; and
   measuring the response time required to bring the remediation system back to a fully operational or equilibrium state.

8. The method of claim 2, further comprising the step of analyzing the first test report and dispatching a servicing agent to the building or structure if maintenance is required.

9. The method of claim 2 further comprising the steps of:
   activating the ventilation fan or pump;
   after the ventilation fan or pump has been activated, sensing the fluid flow through the exhaust conduit; and
   transmitting a second test report back to a remote computer.

10. The method of claim 9 wherein the first test report and the second test report are transmitted separately.

11. The method of claim 10 wherein the first test report and the second test report are transmitted together.

12. The method of claim 10 wherein the first test report and the second test report are a common test report.

13. The method of claim 9 further comprising:
   entering a self-test mode, wherein the self-test mode automatically performs the shutting down step, the sensing the presence of fluid flow through the exhaust conduit step; the transmitting the first test report step, the activating the ventilation fan or pump step, the sensing the fluid flow through the exhaust conduit after the ventilation fan or pump has been activated step; and the transmitting the second test report step.

14. The method of claim 13 further comprising:
   automatically entering the self-test mode on a periodic or intermittent basis.

* * * * *